April 4, 1961 B. L. WELLS ET AL 2,978,116
SWIVEL POST AND POWER OSCILLATOR ASSEMBLY
Filed Nov. 25, 1957
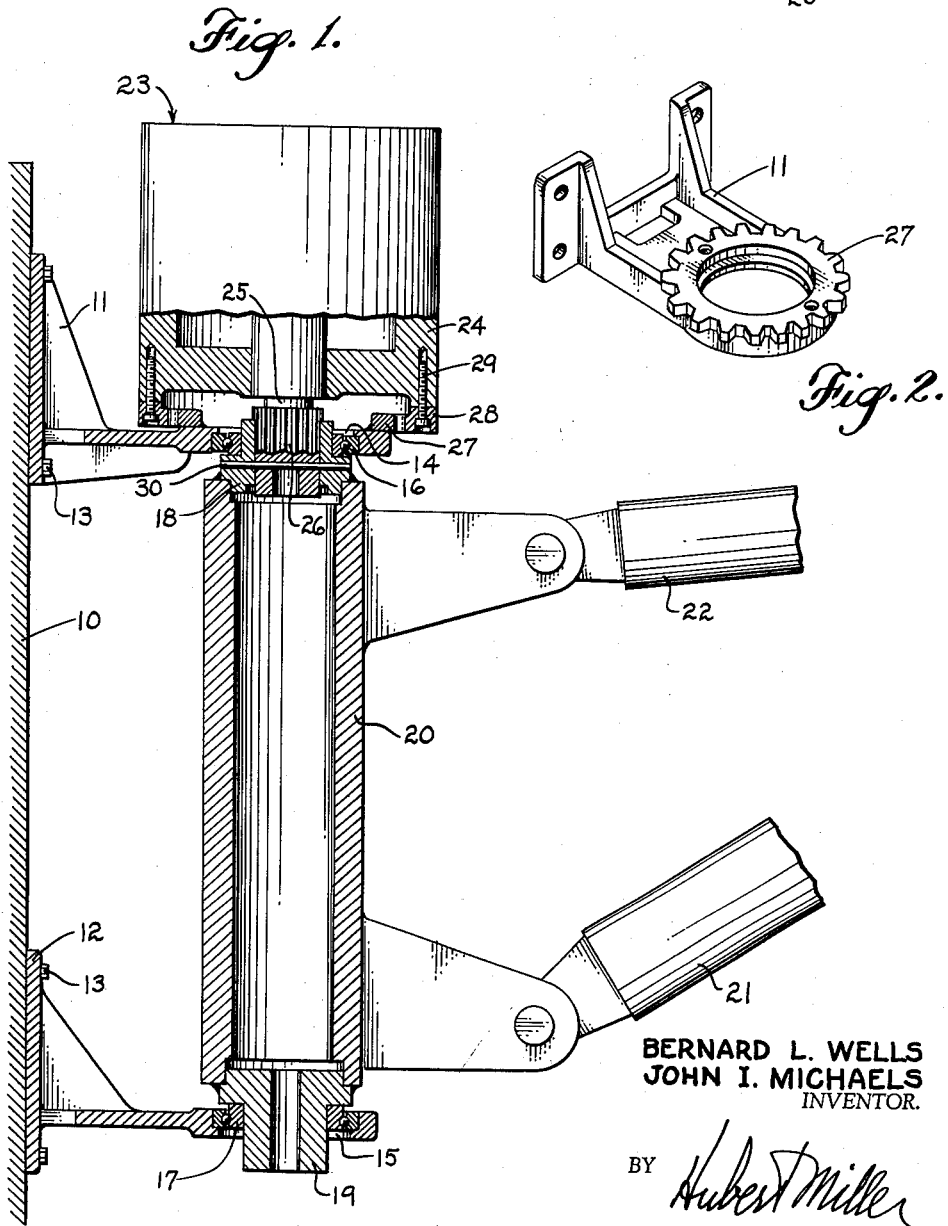
BERNARD L. WELLS
JOHN I. MICHAELS
INVENTOR.
BY ATTORNEY

United States Patent Office 2,978,116
Patented Apr. 4, 1961

2,978,116

SWIVEL POST AND POWER OSCILLATOR ASSEMBLY

Bernard L. Wells and John I. Michaels, Wichita, Kans., assignors to Massey-Ferguson, Inc., a corporation of Maryland Filed Nov. 25, 1957, Ser. No. 698,835

5 Claims. (Cl. 212—68)

This invention relates generally to the combination of a swivel post and a power unit for oscillating the post about its longitudinal axis.

More particularly the invention relates to a means for mounting and supporting the power unit and for operably connecting its power shaft to the swivel post.

The invention is illustrated herein as applied to a mechanical shovel, although it is adapted for use in many other mechanisms which embody the combination of a swivel post and a power actuator therefor, whether the actuator be electrically or hydraulically powered.

In mechanisms or machines which include this combination of swivel post and actuator, as in the mechanical shovel, the swivel post often supports one end of a radially extending boom, and as the actuator oscillates the post about its upright axis the boom is swung in an arc about the post axis. Generally the power unit or actuator which oscillates the post is, by design, limited in the number of degrees it is capable of rotating the post in each direction from a central or neutral position. The arc through which the boom may be swung is thus similarly limited. It is often desirable that this swinging arc be changed with respect to the fixed frame of the shovel so that the boom can be swung a greater distance clockwise, for instance, and a correspondingly lesser distance counterclockwise, or vice versa.

With a conventional fixed arc power unit, this can only be accomplished by changing the position of the power unit housing with relation to the machine frame—which, in other words, is a re-orientation of the power unit housing. Such a change involves removal of power unit mounting bolts, partial rotation of the power unit housing in the desired direction, replacement of the mounting bolts, and a very careful and accurate re-alignment of the axes of the power unit shaft and the swivel post.

It is a primary object of this invention to provide a mounting mechanism for the power unit housing and a mechanism for coupling the power unit shaft to the swivel post which together cooperate to permit quick and easy re-orientation of the power unit housing with respect to the machine frame, and which also permit self-alignment of the power unit shaft axis with the axis of the swivel post, after such re-orientation, all without the removal and replacement of bolts or other such means for holding the power unit housing.

By affording self-alignment of the power shaft axis with the fixed axis of the swivel post, the invention eliminates close tolerance manufacture of the power unit supporting and connecting parts, thus materially reducing the cost of manufacture of the entire assembly.

It is an additional object of the invention to provide a swivel post and power oscillator coupling mechanism which will reduce to a minimum the transmission of bending loads either from the power unit shaft to the swivel post, or vice versa, and which will therefore materially lengthen the life of the bearings in which they are respectively journaled.

The invention, together with other objects, will be more clearly understood when the following description is read with reference to the accompanying drawings, in which:

Fig. 1 is a vertical sectional view through a swivel post and actuator assembly mounted on the frame of a mechanical shovel, such frame being shown only fragmentarily, such assembly embodying the invention;

Fig. 2 is a detailed top perspective view of a mounting bracket which includes an inner spline member which constitutes a part of the invention; and Fig. 3 is a bottom perspective view of a portion of an actuator housing with outer spline member attached.

Referring to the drawing the numeral 10 designates a portion of the rigid frame of a mechanical shovel.

A pair of rigid supporting brackets 11 and 12 are secured to frame 10 by bolts 13. The brackets are respectively provided with apertures 14 and 15 which respectively seat bearings 16 and 17. Brackets 11 and 12 are positioned so that the centers of these bearings, when seated, are in vertical alignment.

Bearings 16 and 17 respectively journal the upper and lower end fittings 18 and 19 of a swivel post 20. This swivel post pivotally carries the inner end of a boom 21 and the inner end of a boom actuating hydraulic cylinder 22.

A swivel post oscillating power unit, designated as a whole by the numeral 23 has one end of its housing positioned adjacent the upper surface of bracket 11. The unit illustrated is of the hydraulic type, and is generally referred to as a hydraulic rotary actuator. It includes a housing 24 which journals a power shaft 25, one end of which projects from the housing. The projecting end of shaft 25 concentrically carries an extreally serrated inner spline member 26 which complementally seats in an internally serrated aperture in fitting 18. The fitting 18 thus constitutes an outer spline member which is welded or otherwise non-rotatably secured to the upper end of post 20. The described interlocking inner and outer spline members 26 and 18 constitute a spline coupling for transmitting torque from the power unit shaft 25 to the post 20.

As a means of permitting self alignment of the axis of power shaft 25 with the axis of post 20, while positively preventing the rotation of power unit housing 24, a second spline coupling arrangement is provided between housing 24 and the adjacnet bracket 11.

To this end an externally toothed ring 27 is welded to the upper surface of bracket 11 in a position concentric to the aperture therein and to the bearing 16, the ring, as shown, being quite shallow in the axial direction.

A complemental shallow internally toothed ring 28 is rigidly secured by bolts 29 to the lower end of housing 24, the toothed aperture in ring 28 being arranged concentric to the axis of shaft 25. Complementally interfitting toothed rings 27 and 28 will be herein referred to as spline members, because of their function. The teeth illustrated are of the sprocket type, but gear type teeth would serve equally well so long as the inner spline member 27 is complementally received and seated in the toothed aperture of the outer spline member. Any other irregularly contoured interfitting surfaces would also serve.

For the purpose of this invention the interfitting surfaces of spline members 18 and 26 should have a relatively close tolerance fit. In fact, it is preferable that there be a press fit between these two spline members. After spline member 26 is seated in spline member 18 a knock out pin 30 is driven into registering transverse holes in the two members. The actual weight of the power unit 23 is thus carried by the swivel post 20, independent of the bracket 11.

On the other hand it is preferable that the interfitting surfaces of spline members 27 and 28 have a relatively larger tolerance interfit. By providing such a relationship between the two spline couplings power unit housing 24 is permitted a very slight radial movement with respect to the rotational axis of post 20, thus affording self alignment of the axis of shaft 25 with the rotational axis of post 20, and eliminating side loads on their respective bearings.

*Assembly and operation*

To re-orient power unit 23 with respect to its supporting bracket 11, knock out pin 30 is removed and the entire power unit lifted and rotated the desired number of degrees in the desired direction. Spline member 26 is then inserted in spline member 18 and the unit is lowered until spline member 27 enters spline member 28. Knock-out pin 30 is then driven into registering transverse holes in members 18 and 26. This prevents further endwise movement of the power unit with respect to the swivel post in either direction. An alternative to the use of pin 29 is to provide spline member 18 with a blind bore so that penetration of the lower end of spline member 26 in a downward direction would be limited by the closed end of the bore. It should be noted that no bolts or other attaching means are required between the power unit and the bracket 11.

Having described the invention with sufficient clarity to enable those familiar with this art to construct and use it, we claim:

1. A swivel post and power actuator assembly comprising: an upright swivel post; two spaced fixed position aligned brackets each journaling one end of said post; a rotary actuator positioned adjacent one of said brackets for oscillating the swivel post, said actuator including a housing and a power oscillated shaft projecting therefrom, the projecting end of the shaft being disposed in alignment with and adjacent an end of the swivel post; a first spline type coupling connecting the adjacent ends of the actuator shaft and the swivel post for simultaneous oscillation; and a second spline type coupling connecting the actuator housing and its adjacent bracket to lock the housing against rotation with respect to the bracket, the second spline coupling being substantially larger in diameter than the first spline coupling and arranged to surround the same.

2. A swivel post and power actuator assembly comprising: an upright swivel post; two spaced fixed position brackets each journaling an end portion of said post; a rotary actuator including a housing and a power actuated shaft having an end projecting from an end of the housing, the projecting end of the shaft being disposed in alignment with and adjacent an end of the swivel post, and the adjacent end of the housing being positioned adjacent one of said brackets; a splined member carried by and rotatable with the projecting end of said shaft; a complemental interfitting splined member carried by and rotatable with the abutting end of said swivel post, the two said splined members constituting a positive torque transmitting coupling between the shaft and post; a third splined member carried non-rotatable by the said adjacent end of the housing; and a fourth splined member carried non-rotatable by the adjacent bracket, the third and fourth splined members also having a complemental interfit and constituting a means for preventing rotation of the actuator housing with respect to the adjacent bracket.

3. The mechanism described in claim 2 in which the first two mentioned splined members have a relatively small tolerance interfit, and the third and fourth splined members have a relatively larger tolerance interfit, thus permitting slight radial movement of the actuator housing with respect to the swivel post rotational axis to afford self alignment of the power shaft axis therewith.

4. A swivel post and power actuator assembly comprising an upright swivel post, two spaced fixedly positioned alined brackets each journaling one end of said post; a rotary actuator positioned adjacent one of said brackets for oscillating the swivel post, said actuator including a housing and a power oscillated shaft projecting therefrom, the projecting end of the shaft being disposed in alinement with and adjacent an end of the swivel post, a first spline type coupling connecting the adjacent ends of the actuator shaft and the swivel post for simultaneous oscillation, and a second spline type coupling connecting the actuator housing and its adjacent bracket to lock the housing against rotation with respect to the bracket, the spline type couplings having a different tolerance interfit thus permitting slight movement of the actuator housing in any radial direction about its shaft with respect to its supporting bracket and thereby affording self-alinement of the actuator shaft axis with the swivel post axis.

5. In a swivel post and power actuator assembly for a power shovel or the like, the combination comprising an upright swivel post, an upper bracket and a lower bracket alined with one another and each journaling one end of said post, a rotary actuator positioned above the upper bracket for oscillating the swivel post, said actuator including a housing and a power oscillated shaft projecting downwardly therefrom, the projecting end of the shaft being disposed adjacent and in alinement with the upper end of the swivel post, a first spline type coupling connecting the adjacent ends of the actuator shaft and the swivel post for oscillating the latter, and a second spline type coupling at the lower end of the actuator for connecting the housing to its bracket to lock the housing against rotation with respect to the bracket, the second spline coupling being substantially larger in diameter than the first spline coupling and arranged to surround the same, the second spline coupling being axially shallow with respect to the first so that the phase position of the housing with respect to the associated bracket may be changed by lifting the housing through a small distance, rotating it, and reseating it in a new angular position.

References Cited in the file of this patent

UNITED STATES PATENTS

| 2,774,483 | Raymond | Dec. 18, 1956 |
| 2,834,489 | Davis | May 13, 1958 |
| 2,851,258 | Siehrs | Sept. 9, 1958 |

FOREIGN PATENTS

| 1,098,901 | France | Mar. 16, 1955 |